(12) United States Patent
Capra et al.

(10) Patent No.: US 10,023,691 B2
(45) Date of Patent: Jul. 17, 2018

(54) POLYMERIC MATERIALS

(71) Applicant: Victrex Manufacturing Limited, Lancashire (GB)

(72) Inventors: Carlo Capra, Griesheim (DE); Christoper Peter Tyler, Lancashire (GB); Brian Wilson, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 475 days.

(21) Appl. No.: 14/351,599

(22) PCT Filed: Oct. 10, 2012

(86) PCT No.: PCT/GB2012/052517
§ 371 (c)(1),
(2) Date: Apr. 14, 2014

(87) PCT Pub. No.: WO2013/054114
PCT Pub. Date: Apr. 18, 2013

(65) Prior Publication Data
US 2014/0235787 A1    Aug. 21, 2014

(30) Foreign Application Priority Data

Oct. 14, 2011 (GB) .................................. 1117796.1

(51) Int. Cl.
| | | |
|---|---|---|
| C08G 65/40 | (2006.01) | |
| C08G 75/23 | (2006.01) | |
| C08L 71/00 | (2006.01) | |
| C08K 3/04 | (2006.01) | |
| C08K 7/06 | (2006.01) | |
| C08K 7/14 | (2006.01) | |
| C08L 81/06 | (2006.01) | |

(52) U.S. Cl.
CPC ......... *C08G 65/4012* (2013.01); *C08G 75/23* (2013.01); *C08K 3/04* (2013.01); *C08K 7/06* (2013.01); *C08K 7/14* (2013.01); *C08L 71/00* (2013.01); *C08L 81/06* (2013.01)

(58) Field of Classification Search
None
See application file for complete search history.

(56) References Cited

U.S. PATENT DOCUMENTS

| | | | |
|---|---|---|---|
| 4,766,197 A | | 8/1988 | Clendinning et al. |
| 4,829,143 A | * | 5/1989 | Clendinning ...... C08G 65/4012 528/125 |
| 4,904,532 A | * | 2/1990 | Staniland ............. C08J 5/04 428/408 |
| 4,942,216 A | | 7/1990 | Heinz et al. |
| 5,008,364 A | * | 4/1991 | Ittemann ............. C08L 71/00 528/125 |
| 2005/0010015 A1 | | 1/2005 | Zhang et al. |
| 2010/0216944 A1 | | 8/2010 | Wilson et al. |

FOREIGN PATENT DOCUMENTS

| | | |
|---|---|---|
| CN | 86103808 | 3/1987 |
| EP | 102158 | 3/1984 |
| EP | 102159 | 3/1984 |
| GB | 2427865 | 1/2007 |
| JP | 61-37419 | 2/1986 |
| WO | 03093354 | 11/2003 |

OTHER PUBLICATIONS

International Search Report for Application No. PCT/GB2012/052517 dated Mar. 25, 2013 (3 pages).
Wang, X. et al., "Synthesis and characterization of novel poly(aryl ether ketone)s," Polymer Preprints (American Chemical Society, Division of Polymer Chemistry), vol. 44, No. 2, Jan. 1, 2003, p. 844, Retrieved from the Internet <URL: http://pubs.acs.org/meetingpreprints/poly/meet226/113-634797.pdf>.
Wang, H. et al., "Synthesis and nonisothermal crystallization of kinetics of PEEK-PEDEK alternative copolymer," Polymer Preprints (American Chemical Society, Division of Polymer Chemistry), 44(2), Jan. 1, 2003, pp. 946-947, Retrieved from the Internet <URL: http://pubs.acs.org/meetingpreprints/poly/meet226/168-635103.pdf>.
Blundell, D. et al., "The morphology of poly(aryl-ether-ether-ketone)," Polymer, vol. 24, Issue 8, Aug. 1983, pp. 953-958.
Cornèlis, H. et al., "Solvent-induced crystallization of amorphous poly(ether ether ketone) by acetone," Polymer, vol. 37, Issue 20, Sep. 1996, pp. 4573-4578.
Chalmers, J. et al., "Crystallinity in poly(aryl-ether-ketone) plaques studied by multiple internal reflection spectroscopy," Polymer Bulletin, May 1, 1984, vol. 11, Issue 5, pp. 433-435.
Miller, A. et al., "Impregnation techniques for thermoplastic matrix composites," Polymer & Polymer Composites, 1996 vol. 4, Issue 7, pp. 459-481.
Vodermayer, A. et al., "Manufacture of high performance fibre-reinforced thermoplastics by aqueous powder impregnation," Composites Manufacturing, vol. 4, Issue 3, Sep. 1993, pp. 123-132.
Office Action from the State Intellectual Property Office of P.R. China for Application No. 201280050470.8 dated Aug. 4, 2015 (English Translation, 6 pages).
Office Action from the Japanese Patent Office for Application No. 2014-535164 dated Sep. 20, 2016 (English Translation, 6 pages).
Wang, S., "Study on synthesis and properties of poly(ether ether ether ketone ketone) and copolymers," Full Database of Outstanding Doctoral and Master Thesis of China (Master) in Engineering Technology, Dec. 15, 2004, vol. 1, Issue 4, B016-199 (Abstract Included).

* cited by examiner

*Primary Examiner* — Ling Siu Choi
*Assistant Examiner* — Thuy-Ai N Nguyen
(74) *Attorney, Agent, or Firm* — Michael Best & Friedrich LLP

(57) ABSTRACT

Polymers comprising polyetheretheretherketone and polyetherdiphenyletherketone and polymers comprising polyetheretheretherketone and polyetheretherethersulphone are described which have advantageous Tn and/or Tg properties.

9 Claims, No Drawings

POLYMERIC MATERIALS

BACKGROUND OF THE INVENTION

This invention relates to polymeric materials. Preferred embodiments relate to thermoplastic composites comprising polymeric materials for use, for example, in the composites industry.

There is a wide range of thermoplastic polymeric material available for use in industry, either alone or as part of composite materials. However, industry is constantly demanding materials with properties which are improved in at least some respect over existing materials.

Polyphenylene sulphide (PPS) is a known polymeric material with a relatively low melting temperature (Tm) of 290° C.; however its glass transition temperature (Tg) is 85° C. to 100° C. which is too low for some applications. On the other hand, polyetheretherketone (PEEK) has a suitable Tg of 143° C. but its Tm of 343° C. is much higher than desirable.

It is an object of the present invention to provide a polymeric material which has a relatively low Tm (comparable to that of PPS) but which has a higher Tg, closer to that of PEEK.

SUMMARY OF THE INVENTION

This invention is based upon the discovery of repeat units which can be combined with other specified repeat units to produce copolymers which have advantageous properties, particularly in terms of their glass transition temperatures (Tg) and melting temperatures (Tm).

It is an object of preferred embodiments of the present invention to address the above described problem.

It is an object of preferred embodiments of the invention to provide advantageous polymeric materials for example for use in composite materials.

According to a first aspect of the invention, there is provided a polymeric material having a repeat unit of formula —X-Ph-(X-Ph-)$_n$X-Ph-CO-Ph-    I and a repeat unit of formula —X—Y—W-Ph-Z—    II wherein Ph represents a phenyl moiety; each X independently represents an oxygen or sulphur atom; n represents an integer of 1 or 2; Y is selected from a phenyl moiety, a -Ph-Ph- moiety and a naphthalenyl moiety; W is a carbonyl group, an oxygen or sulphur atom, Z is selected from
—X-Ph-SO$_2$-Ph-
—X-Ph-SO2-Y—SO2-Ph- and
—CO-Ph-;
said polymeric material having a Tm of less than 298° C.

The phenyl moieties in each repeat unit may independently have 1,4-linkages to atoms to which they are bonded or 1,3-linkages. Where a phenyl moiety includes 1,3-linkages, the moiety will be in amorphous phases of the polymer. Crystalline phases will include phenyl moieties with 1,4-linkages. In many situations it is preferred for the polymeric material to be crystalline and, accordingly, said polymeric material preferably includes phenyl moieties with 1,4-linkages.

In a preferred embodiment, each Ph moiety in the repeat unit of formula I has 1,4-linkages to moieties to which it is bonded.

In a preferred embodiment, each Ph moiety in the repeat unit of formula II has 1,4-linkages to moieties to which it is bonded.

In repeat unit I, each X preferably represents an oxygen atom.

Preferably, n represents 1.

In repeat unit I, preferably each phenyl moiety has 1,4-linkages to atoms to which it is bonded.

In repeat unit II, each X preferably represents an oxygen atom.

Preferably, Y is selected from a phenyl moiety and a -Ph-Ph- moiety, wherein each Ph moiety in said -Ph-Ph- includes 1,4-linkages. More preferably, Y is a -Ph-Ph- moiety wherein each phenyl moiety has 1,4-linkages.

Preferably, W represents an oxygen atom.

Preferably, Z is —CO-Ph-, suitably wherein Ph has 1,4-linkages.

In a preferred embodiment, said repeat unit of formula I has the structure:

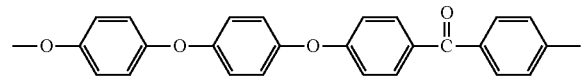

and said repeat unit of formula II has the structure:

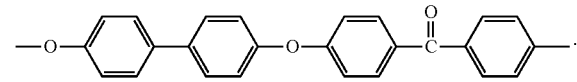

The level and extent of crystallinity in a polymer may be measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning calorimetry (DSC) in a process such as the following which is also described in POLYMER Vol. 37, Number 20, 1996, page 4573.

DSC may be used to examine an 8 mg plus or minus 3 mg sample of polymeric material in a TA Instruments DSC Q100 under nitrogen at a flow rate of 40 ml/min. The scan procedure may be:
Step 1 Perform and record a preliminary thermal cycle by heating the sample from 30° C. to 400° C. at 20° C./min, recording the Tg, Tn and Tm.
Step 2 Hold for 2 mins
Step 3 Cool at 20° C./min to 30° C. and hold for 5 mins.
Step 4 Heat from 30° C. to 400° C. at 20° C./min, recording the Tg, Tn and Tm.

From the resulting curve the onset of the Tg may be obtained as the intersection of lines drawn along the pre-transition baseline and a line drawn along the greatest slope obtained during the transition. The Tn is the temperature at which the main peak of the cold crystallisation exotherm reaches a maximum. The Tm is the temperature at which the main peak of the melting endotherm reaches a maximum. The Tc is the temperature at which the main peak of the crystallisation from the melt exotherm reaches a maximum.

The Heat of Fusion (ΔH (J/g)) may be obtained by connecting the two points at which the melting endotherm deviates from the relatively straight baseline. The integrated area under the endotherm as a function of time yields the enthalpy (mJ) of the transition, the mass normalised Heat of Fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

The aforementioned methods provide the level of crystallinity in a bulk sample. As an alternative, FTIR may be used to assess crystallinity and this may be used to assess the level of crystallinity at a surface and/or across the thickness or surface of a sample. Reference is made to a paper titled "Crystallinity in Poly(Aryl-Ether-Ketone) Plaques Studied by Multiple Internal Reflection Spectroscopy" (Polymer Bull, 11, 433 (1984)).

In a preferred embodiment, DSC may be used to measure crystallinity of a bulk sample. FTIR may be used to measure crystallinity at a surface.

The Tm of said polymeric material may be less than 296° C., is suitably less than 293° C., is preferably less than 290° C. In some embodiments, the Tm may be less than 287° C. or less than 285° C. The Tm may be greater than 270° C., or greater than 275° C., 280° C. or 285° C. The Tm is preferably in the range 280° C. to 295° C.

The Tg of said polymeric material may be greater than 120° C., preferably greater than 130° C., more preferably 133° C. or greater. The Tg may be less than 175° C., less than 150° C., less than 140° C. or less than 130° C. The Tg is preferably in the range 130° C. to 140° C.

The difference (Tm−Tg) between the Tm and Tg may be at least 130° C., preferably at least 140° C., more preferably at least 150° C. The difference may be less than 170° C. or less than 161° C. In a preferred embodiment, the difference is in the range 150-160° C.

In a preferred embodiment, said polymeric material has a Tg in the range 130° C.-140° C., a Tm in the range 285° C. to 292° C. and the difference between the Tm and Tg is in the range 150° C. to 161° C.

Said polymeric material may have a crystallinity measured by at least one of the methods selected from WAXS, DSC or FTIR as described above of at least 10%, preferably at least 20%, more preferably at least 25%. The crystallinity may be less than 50% or less than 40%.

Said polymeric material suitably has a melt viscosity (MV) of at least 0.06 kNsm$^{-2}$, preferably has a MV of at least 0.08 kNsm$^{-2}$, more preferably at least 0.085 kNsm$^{-2}$, especially at least 0.09 kNsm$^{-2}$. MV is suitably measured using capillary rheometry operating at 400° C. at a shear rate of 1000 s$^{-1}$ using a tungsten carbide die, 0.5 mm×3.175 mm. Said polymeric material may have a MV of less than 1.00 kNsm$^{-2}$, suitably less than 0.5 kNsm$^{-2}$.

Said polymeric material may have a tensile strength, measured in accordance with ASTM D790 of at least 40 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ASTM D790 of at least 145 MPa. The flexural strength is preferably in the range 145-180 MPa, more preferably in the range 145-165 MPa.

Said polymeric material may have a flexural modulus, measured in accordance with ASTM D790, of at least 2 GPa, preferably at least 3 GPa, more preferably at least 3.5 GPa. The flexural modulus is preferably in the range 3.5-4.5 GPa, more preferably in the range 3.5-4.1 GPa.

Said polymeric material may include at least 50 mol %, preferably at least 60 mol %, more preferably at least 65 mol %, especially at least 70 mol % of repeat units of formula I. Particular advantageous polymeric materials may include at least 72 mol %, or, especially, at least 74 mol % of repeat units of formula I. Said polymeric material may include less than 85 mole %, suitably 80 mol % or less of repeat units of formula I. Said polymeric material may include 68 to 82 mole %, preferably 70 to 80 mol %, more preferably 72 to 77 mol % of units of formula I.

Said polymeric material may include at least 15 mol %, preferably at least 20 mol %, of repeat units of formula II. Said polymeric material may include less than 50 mol %, preferably less than 40 mol %, more preferably less than 35 mol %, especially less than 30 mol % of repeat units of formula II. Particularly advantageous polymeric materials may include 28 mol % or less; or 26 mol % or less. Said polymeric material may include 18 to 32 mol %, preferably 20 to 30 mol %, more preferably 23 to 28 mol % of units of formula II.

The sum of the mole % of units of formula I and II in said polymeric material is suitably at least 95 mol %, is preferably at least 98 mol %, is more preferably at least 99 mol % and, especially, is about 100 mol %.

The ratio defined as the mole % of units of formula I divided by the mole % of units of formula II may be in the range 1.8 to 5.6, is suitably in the range 2.3 to 4 and is preferably in the range 2.6 to 3.3.

Said polymeric material may be part of a composition which may include said polymeric material and a filler means. Said filler means may include a fibrous filler or a non-fibrous filler. Said filler means may include both a fibrous filler and a non-fibrous filler.

A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material and said filler means are mixed at an elevated temperature, suitably at a temperature at or above the melting temperature of said polymeric material. Thus, suitably, said polymeric material and filler means are mixed whilst the polymeric material is molten. Said elevated temperature is suitably below the decomposition temperature of the polymeric material. Said elevated temperature is preferably at or above the main peak of the melting endotherm (Tm) for said polymeric material. Said elevated temperature is preferably at least 300° C. Advantageously, the molten polymeric material can readily wet the filler and/or penetrate consolidated fillers, such as fibrous mats or woven fabrics, so the composite material prepared comprises the polymeric material and filler means which is substantially uniformly dispersed throughout the polymeric material.

The composite material may be prepared in a substantially continuous process. In this case polymeric material and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt comprising said polymeric material. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872.

Alternatively, the composite material may be prepared in a discontinuous process. In this case, a predetermined amount of said polymeric material and a predetermined amount of said filler means may be selected and contacted and a composite material prepared by causing the polymeric material to melt and causing the polymeric material and filler means to mix to form a substantially uniform composite material.

The composite material may be formed into a particulate form for example into pellets or granules. Pellets or granules may have a maximum dimension of less than 10 mm, preferably less than 7.5 mm, more preferably less than 5.0 mm.

Preferably, said filler means comprises one or more fillers selected from glass fibre, carbon fibre, carbon black and a fluorocarbon resin. More preferably, said filler means comprises glass fibre or carbon fibre.

A composition or composite material as described may include 20 to 70 wt % of said polymeric material and 30 to 80 wt % of filler means. Preferred embodiments include greater than 40 wt % of filler means.

The invention extends to a composite material as described per se.

The polymeric material of the first aspect may be made using an electrophilic route or a nucleophilic route, but the nucleophilic route is preferred. In a preferred embodiment, the method comprises polycondensing a compound of formula

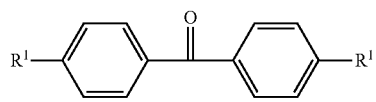

III with a compound of formula

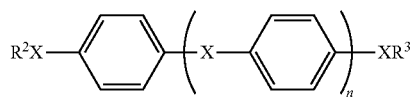

IV and with one or more compounds arranged to generate moiety II,
wherein each $R^1$ is selected from a chlorine and fluorine atom, $R^2$ is selected from an alkali metal and a hydrogen atom and $R^3$ is selected from an alkali metal and a hydrogen atom.

Moiety II may be generated by undertaking said polycondensation reaction in the presence of additional monomers selected from groups (a) to (e) below:

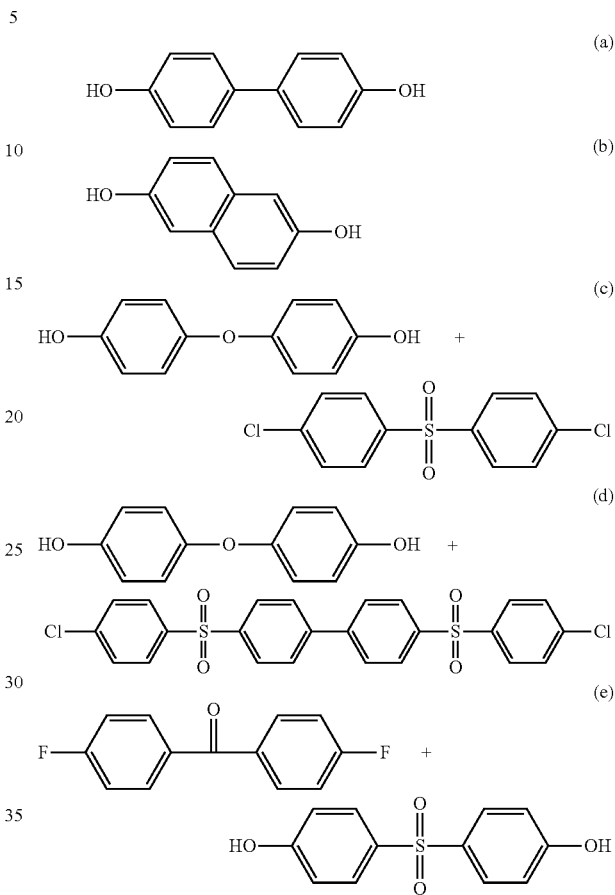

wherein each $R^4$ is selected from a chlorine and a fluorine atom and each $R^5$ is selected from a chlorine and a fluorine atom.

Preferably, substantially the only monomers used in the method are those of formulas III and IV, together with said one or more compounds (a) to (e) arranged to generate moiety II.

Suitably, the number of moles of monomers which include chlorine or fluorine atoms which are polycondensed in the method are in slight molar excess over the number of moles of monomers which include alkali metal or hydrogen end groups.

The method of making the polymeric material may be as described in EP1879, mutatis mutandis.

Any invention described herein may be combined with any aspect of any other invention or embodiment described herein mutatis mutandis.

Specific embodiments of the invention will now be described, by way of example.

Polymers were prepared as described in Examples 1 to 8 and tested as described in Example 9.

Example 1—Preparation of
Polyetheretheretherketone
(PEEEK)-Polyetherdiphenyletherketone (PEDEK)
Copolymer A 0.5 liter flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxydiphenylether (58.62 g, 0.280 mole), 4,4'-dihydroxybiphenyl (22.35 g, 0.120 mole) and diphenylsulphone (250 g) and purged with nitrogen for over 1 hour. The contents were then heated under a nitrogen blanket to 160° C. to form an almost colourless solution. While maintaining a nitrogen blanket, dried sodium carbonate (42.74 g, 0.403 mole) and potassium carbonate (0.14 g, 0.001 mole) were added. The temperature was raised to 310° C. at 1° C./min and held for 60 minutes. The reaction mixture which was poured from the flask was viscous.

The reaction mixture was allowed to cool, milled and washed with acetone and water. The resulting polymer was dried in an air oven at 120° C. producing a powder. The polymer had a melt viscosity at 400° C., 1000 sec$^{-1}$ of 0.36 kNsm$^{-2}$.

Examples 2 to 8—Preparation of Other Polyetheretheretherketone (PEEEK)-Polyetherdiphenyletherketone (PEDEK) Copolymer The procedure described in Example 1 was repeated except that the ratio of 4,4'-dihydroxydiphenylether to 4,4'-dihydroxybiphenyl and the polymerisation times were varied to provide polyetheretheretherketone (PEEEK)-polyetherdiphenyletherketone (PEDEK) copolymers of different compositions and melt viscosities. The results are given in Table 1 below.

Example 9—Preparation of Polyetheretheretherketone (PEEEK)-Polyetheretherethersumer A 0.5 liter flanged flask fitted with a ground glass Quickfit lid, stirrer/stirrer guide, nitrogen inlet and outlet was charged with 4,4'-difluorobenzophenone (71.22 g, 0.326 mole), 4,4'-dihydroxydiphenylether (80.89 g, 0.400 mole), 4,4'-dichlorodiphenylsulphone (23.43 g, 0.082 mole) and diphenylsulphone (254 g) and purged with nitrogen for over 1 hour. The contents were then heated under a nitrogen blanket to 160° C. to form an almost colourless solution. While maintaining a nitrogen blanket, dried sodium carbonate (42.74 g, 0.403 mole) and potassium carbonate (0.14 g, 0.001 mole) were added. The temperature was raised to 310° C. at 1° C./min and held for 70 minutes. The reaction mixture which was poured from the flask was viscous.

The reaction mixture was allowed to cool, milled and washed with acetone and water. The resulting polymer was dried in an air oven at 120° C. producing a powder. The polymer had a melt viscosity at 400° C., 1000 sec$^{-1}$ of 0.20 kNsm$^{-2}$. The polymer had Tg of 133° C., Tn of 194° C. (Hn of 0.92 J/g), Tm of 294° C. (Hm of 41.05 J/g), and a crystallinity of 30.9%.

TABLE 1

| Example No. | PEEEK Moieties (% mol) | PEDEK Moieties (% mol) | PEEES Moieties (%) | Polymerisation time (mins) | MV (@ 400° C. (kNsm$^{-2}$) |
|---|---|---|---|---|---|
| 1 | 70 | 30 | 0 | 60 | 0.36 |
| 2 | 72.5 | 27.5 | 0 | 108 | 0.13 |
| 3 | 72.5 | 27.5 | 0 | 163 | 0.28 |
| 4 | 75 | 25 | 0 | 127 | 0.14 |
| 5 | 75 | 25 | 0 | 95 | 0.18 |
| 6 | 75 | 25 | 0 | 251 | 0.38 |
| 7 | 80 | 20 | 0 | 166 | 0.14 |
| 8 | 80 | 20 | 0 | 110 | 0.30 |
| 9 | 80 | 0 | 20 | 70 | 0.20 |

Example 10—Differential Scanning Colorimetry of Polyaryletherketones of Examples 1 to 9

The Glass Transition Temperature (Tg), the Cold Crystallisation Temperature (Tn), the Melting Temperature (Tm) and Heat of Fusions of Nucleation (ΔHn) and Melting (ΔHm) for the Polyaryletherketones from Examples 1 to 8 were determined by Differential Scanning calorimetry.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. A 8 mg plus or minus 3 mg sample of each film was scanned as follows:

Step 1 Perform and record a preliminary thermal cycle by heating the sample from 30° C. to 400° C. at 20° C./min.
Step 2 Hold for 2 minutes.
Step 3 Cool at 20° C./min to 30° C. and hold for 5 mins.
Step 4 Heat from 30° C. to 400° C. at 20° C./min, recording the Tg, Tn, Tm, ΔHn and ΔHm.

From the resulting scan the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reach maximum.

The Heats of Fusion for Nucleation (ΔHn) and Melting (ΔHm) were obtained by connecting the two points at which the cold crystallisation and melting endotherm(s) deviate from the relatively straight baseline. The integrated areas under the endotherms as a function of time yields the enthalpy (mJ) of the particular transition, the mass normalised Heats of Fusion are calculated by dividing the enthalpy by the mass of the specimen (J/g).

Results are provided in Table 2.

TABLE 2

| Polymer from Example | Tg (° C.) | Tn (° C.) | ΔH$_n$ (J/g) | Tm (° C.) | ΔH$_m$ (J/g) | Level of Crystallinity (%) |
|---|---|---|---|---|---|---|
| 1 | 139 | nd | nd | 283 | 31.8 | 24.5 |
| 2 | 136 | nd | nd | 288 | 37.7 | 29.0 |
| 3 | 135 | 192 | 6.1 | 286 | 33.8 | 21.3 |
| 4 | 138 | 186 | 0.6 | 291 | 35.3 | 26.7 |
| 5 | 135 | nd | nd | 289 | 38.0 | 29.2 |
| 6 | 133 | 193 | 3.5 | 288 | 35.7 | 24.8 |
| 7 | 133 | nd | nd | 295 | 40.2 | 30.9 |
| 8 | 135 | nd | nd | 294 | 38.8 | 29.8 |
| 9 | 133 | 194 | 0.9 | 294 | 41.1 | 30.9 | nd = not detected

Crystallinity (as reported in Table 2) may be assessed by several methods for example by density, by it spectroscopy, by x ray diffraction or by DSC. The DSC method has been used to evaluate the crystallinity that developed in samples annealed at 300° C. for 90 mins in a nitrogen atmosphere. A heating rate of 20° C./min was used until a temperature of 450° C. was attained. A baseline was then constructed under the melting endotherm and the enclosed area used to calculate the heat of fusion of the sample in joules/g. Assuming a heat of fusion of 130 joules/g for the crystalline material present, the degree of crystallinity was calculated.

It will be appreciated that the polymers described in the Examples have low melting points, high glass transition temperatures and high levels of crystallinity. They may therefore be advantageously used in preparation of composites for aerospace (and other applications). Composite materials may be made as described in Impregnation Techniques for Thermoplastic Matrix Composites. A Miller and A G Gibson, Polymer & Polymer Composites 4(7), 459-481 (1996), Manufacture of high performance fibre reinforced thermoplastics by aqueous powder impregnation. A M Vodermayer, J C Kaerger and G Hinrichsen. Composites Manufacturing 4(3), 123-132 (1993), Thermoplastic Aromatic Polymer Composites, F N Cogswell, EP102158 and EP102159.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polymeric material having a repeat unit of formula I:

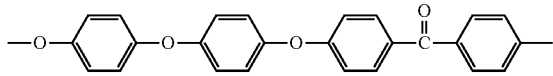

and a repeat unit of formula II:

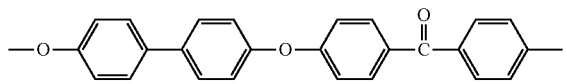

wherein said polymeric material includes 60-80 mole % of units of Formula I and 20-40 mole % of units of Formula II; and wherein the sum of the mole % of units of Formula I and II in said polymeric material is at least 95 mole %;

said polymeric material having a Tm of less than 298° C.

2. A material according to claim 1, wherein the Tg of said polymeric material is greater than 120° C., and the difference between the Tm and Tg is at least 140° C.

3. A material according to claim 1, wherein said polymeric material has a crystallinity measured by DSC of at least 20%.

4. A material according to claim 1, wherein the melt viscosity (MV) of said polymeric material is at least 0.06 kNsm$^{-2}$ and is less than 1.00 kNsm$^{-2}$.

5. A material according to claim 1, wherein said polymeric material includes 70-80 mole % of units of Formula I and 20-30 mole % of units of Formula II.

6. A material according to claim 1, wherein the ratio defined as the mole % of units of Formula I divided by the mole % of units of Formula II is in the range 2.3 to 4.

7. A material according to claim 1, wherein said polymeric material is part of a composition which includes said polymeric material and a filler means, wherein said filler means is selected from a fibrous filler or a non-fibrous filler.

8. A material according to claim 7, wherein said composition includes 20-70 wt % of said polymeric material and 30-80 wt % of filler means.

9. A material according to claim 7, wherein said filler means is selected from glass fibre, carbon fibre, carbon black and a fluorocarbon resin.

* * * * *